United States Patent Office 2,783,184
Patented Feb. 26, 1957

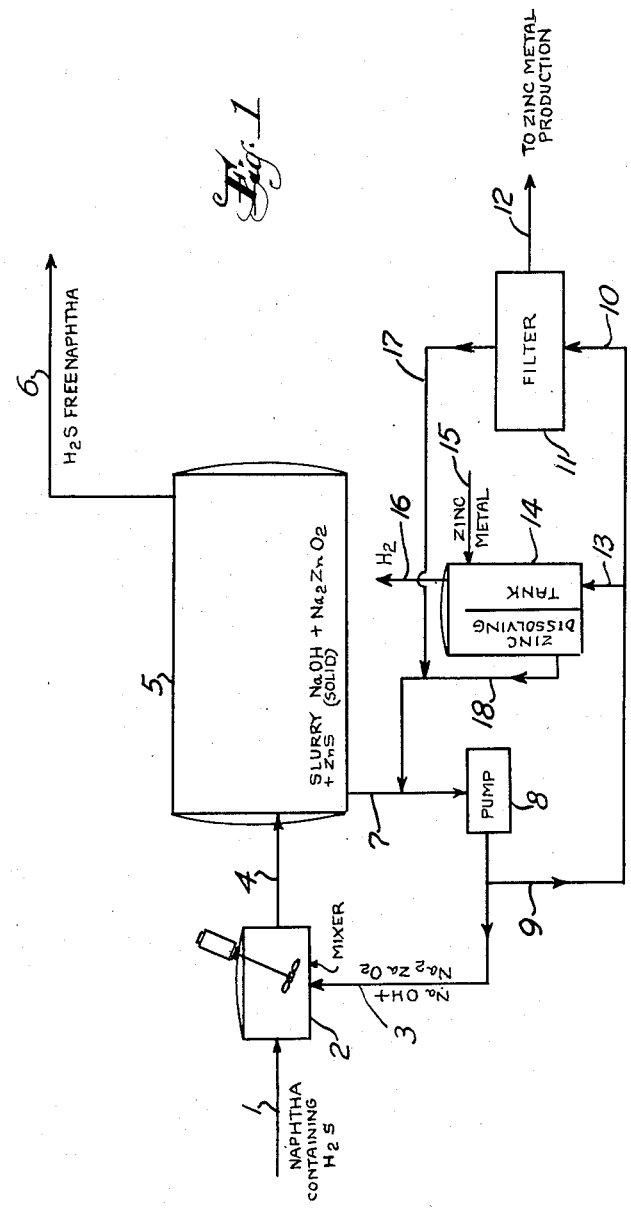

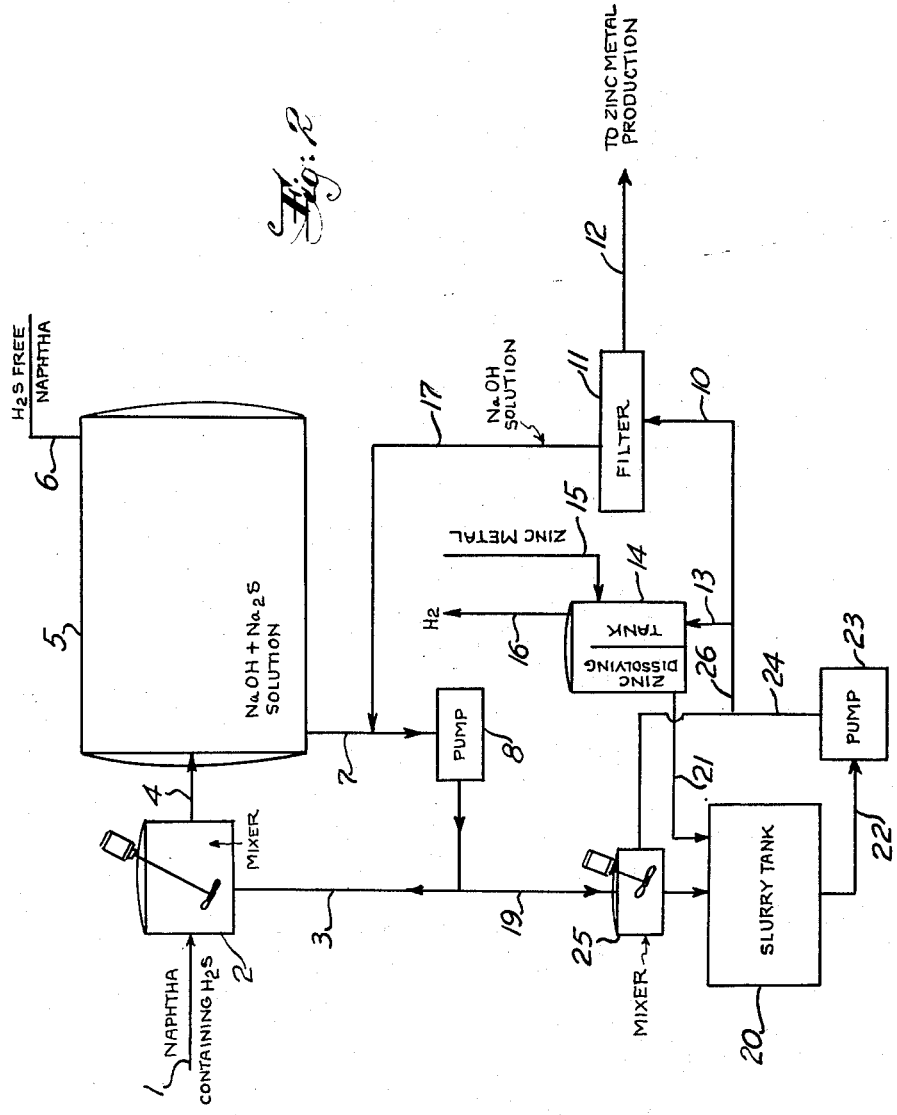

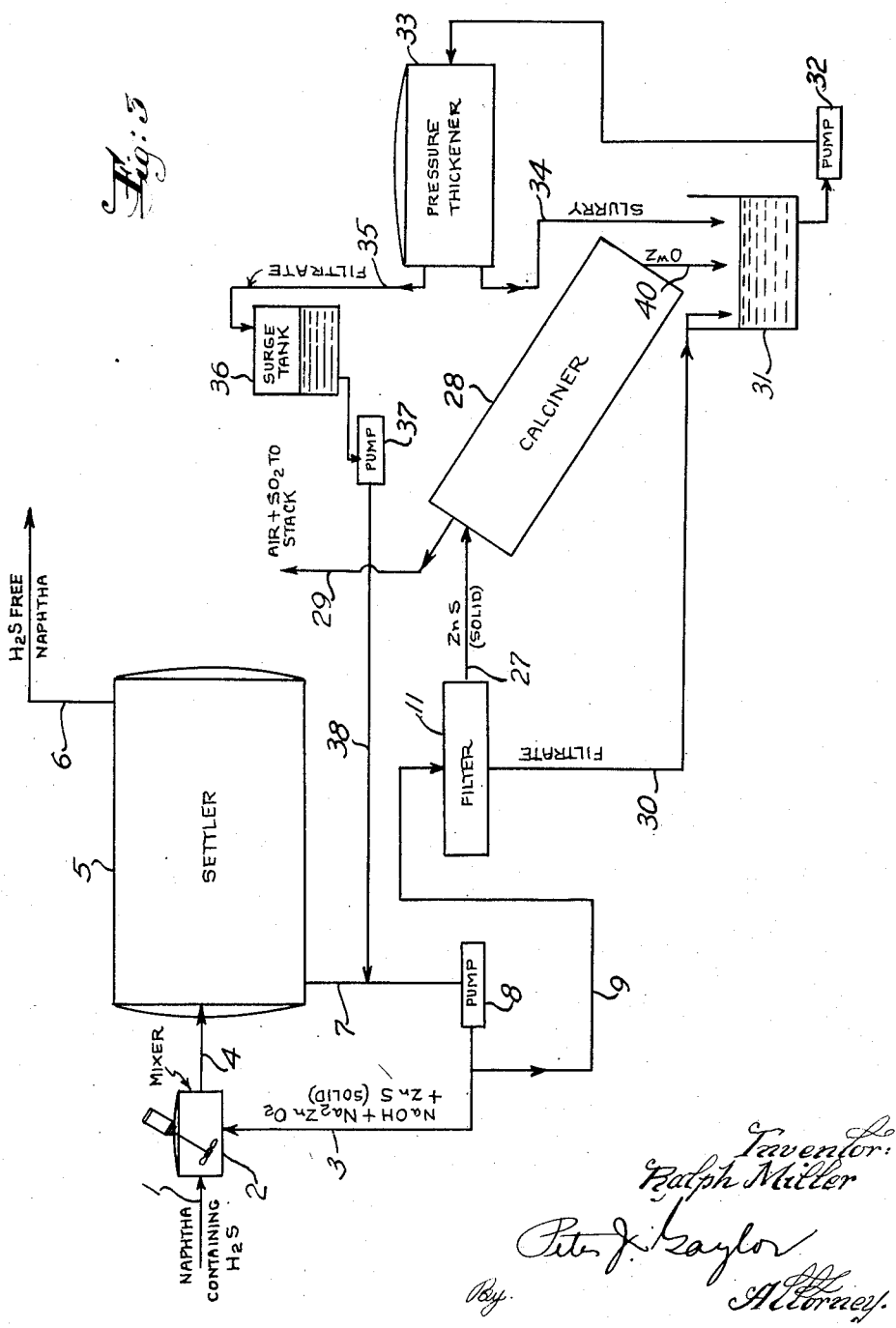

2,783,184

REMOVAL OF ACIDIC SULFUR COMPOUNDS WITH CAUSTIC-ZINC SOLUTIONS

Ralph Miller, Pleasantville, N. Y., assignor to American Development Corporation, Elizabeth, N. J., a corporation of New Jersey Application December 13, 1954, Serial No. 474,681

2 Claims. (Cl. 196—32)

This invention is concerned with the removal of acidic sulfur compounds from water immiscible source materials and more particularly with the removal of hydrogen sulfide and mercaptans from fluids containing relatively small quantities of these objectionable substances. An especially important application of the invention is the treatment of $H_2S$-containing fluids composed predominantly of hydrocarbons. Hydrogen sulfide and mercaptans are objectionable because they impart noxious odors to the hydrocarbons, they are antagonistic to tetraethyl lead, and they cause corrosion of processing equipment and appliances.

The necessity for removing $H_2S$ from petroleum fractions has been recognized for many years and its removal from refinery streams is universal. The removal of $H_2S$ from refinery streams is readily accomplished by contacting the stream with an alkaline solution such as a solution of sodium hydroxide. Various other substances have been suggested and used to remove $H_2S$ from petroleum fractions but, with two exceptions to be mentioned below, they have been found to be less useful than sodium hydroxide.

Sodium hydroxide solutions have a number of important advantages in the aforesaid application. The $H_2S$ is substantially completely removed. Contacting between the hydrocarbon and the aqueous solution can be simple, thus requiring a relatively small capital investment for the contacting equipment. Unit cost of sodium hydroxide is moderate and the equipment employed does not deteriorate in service.

The use of sodium hydroxide for $H_2S$ removal has two serious disadvantages. To date, no economical system has been devised for regenerating the caustic consumed and the sodium sulfide solution formed constitutes a serious waste disposal problem. These two disadvantages have been realized for many years. The short-comings of sodium hydroxide solutions have led to the development of two regenerative processes now in commercial use for removing $H_2S$ from petroleum fractions. One process employs tripotassium phosphate and the other ethanolamines as recycle reagents. Both of these substances under certain conditions will absorb $H_2S$ and under different conditions liberate $H_2S$. Both reagents leave a small residual $H_2S$ content in the petroleum fraction which frequently must be removed by a caustic soda scrub to completely free the product of $H_2S$.

Although these processes are definite advances in the art, they possess disadvantages which result in their being employed almost always when relatively large quantities of $H_2S$ must be removed. The required initial investment is relatively high, especially when the $H_2S$ removal load is small. Process steam is required. Serious corrosion has been experienced in the regeneration portion of the cycle. Appreciable quantities of cooling water are needed. The plants must be elaborately instrumented to secure operating economies. When the system is upset, there is substantially no reserve capacity so that the product quickly goes off specification.

Another disadvantage is the disposal problem of the $H_2S$ which is liberated. Two methods are employed. One method consists of venting $H_2S$ to the atmosphere by means of a stack sufficiently tall so that the $H_2S$ does not constitute a pollutant of the surrounding atmosphere. Costs of stacks of this height are appreciable. Under rare, although possible atmospheric condition, the $H_2S$ vented in this manner can become a serious hazard to the people in the surrounding area. Another method, which is even more costly, is the building of a pipe-line from the $H_2S$ off-take to the nearest flare, boiler or furnace. Ordinarily, the $H_2S$ is vented at substantially atmospheric pressure so that it must be compressed if it is to flow through the pipe-line to a place where it can be burned. The resulting $SO_2$ is mixed with products of combustion, and its quantity is so small compared with the volume of the products of combustion, that it does not increase atmospheric pollution appreciably.

Although the problems connected with the removal of $H_2S$ from petroleum fractions have engaged the attention of the industry for many years, no constructive suggestions have been advanced other than the two processes described above, and they were suggested many years ago. Since the problem still plagues many refineries it is clear that these processes, while applicable in many locations, possess serious drawbacks.

The present invention has for its purpose the complete removal of $H_2S$ from petroleum fractions at a cost which is economical, and which avoids the various difficulties associated with the methods previously advanced. From a fundamental standpoint, the present invention is a regenerative process that employs alkali metal hydroxides, such as sodium hydroxide, to remove $H_2S$ from petroleum fractions and similar source materials. The alkali metal hydroxide solution is regenerated by using zinc as a recycle reagent.

In its simplest aspect, the alkali metal hydroxide is regenerated by contacting the sulfide-containing solution with dissolved zinc to form a solid precipitate of zinc sulfide and to reform the alkali metal hydroxide. The zinc sulfide then is converted to either zinc metal or zinc oxide and returned to the alkali metal hydroxide regeneration step.

Under most circumstances the alkali metal hydroxide employed is sodium hydroxide. Although the sodium hydroxide concentration can vary over a wide range, initial concentrations between about 8 to 25% are most advantageous. It has been found that the process operates well using dilute zinc-containing solutions, such as those containing about 1 to about 30 grams of zinc per liter. The more concentrated the alkali employed, the greater is the permissible zinc concentration, although solutions containing more than about 60 grams per liter of zinc are not recommended.

A particular advantage of the process is that the absorption step can be carried out at any convenient temperature, since the removal of $H_2S$ is complete within any practical temperature range. This means the aqueous solution need not be cooled, but can be circulated at a relatively high temperature so that the aqueous solution does not become viscous. In addition, it is not necessary to cool the hydrocarbon stream prior to the contacting step.

The invention may be understood more readily by reference to the accompanying drawings in which Figure 1 presents a diagrammatic flowsheet for carrying out a process of the present invention wherein the sour naphtha is contacted with all of the zincate slurry. Figure 2 is a similar flowsheet of a process wherein only a portion of the spent zincate slurry is continuously or periodically withdrawn for regeneration. In Figure 3 is depicted a process similar to that of Figure 1 and including the regeneration operation for the spent zincate. Similar numerals refer to similar parts in the various figures.

One method of carrying out the invention is depicted in Figure 1. The hydrocarbon-sulfide source material, e. g. a sour naphtha entering from line 1 is intimately mixed in mixer tank 2 with a slurry composed of a solution of sodium hydroxide containing about 10 g./liter of dissolved zinc plus some suspended zinc sulfide entering the mixing tank from pipe 3. The resulting mixture flows through line 4 into a settler 5. In the mixer tank 2, the $H_2S$ absorbed by the alkaline solution reacts with the dissolved zinc to form an additional amount of solid zinc sulfide. In the settler tank 5 the naphtha separates from the aqueous slurry. The less dense hydrocarbon leaves through line 6 located close to the uppermost part of the settler. The aqueous slurry sinks to the bottom of the settler and leaves by a bottom line 7 which leads to the suction inlet of the circulating pump 8. A sidestream 9 is taken from the pressure side of the pump and is divided into two portions. One portion is led through pipe 10 and through a filter 11 to remove the solid zinc sulfide 12, while the other flows through line 13 through a tank 14 containing metallic zinc. The metallic zinc 15 may be introduced in the form of ingots, powder, chips or any other convenient form of the metal. The zinc-dissolving tank 14 preferably is equipped with a suitably-designed vent 16 through which may escape the hydrogen that is formed.

The filtrate leaving line 17 from the filter 11 and the zinc-enriched solution passing through pipe 18 are both returned to the $H_2S$ removal cycle via line 7. The zinc sulfide precipitate 12 preferably is washed to remove most of the adhering alkali solution before leaving the filter, and the washed zinc sulfide then is converted to zinc metal which is returned to the zinc-dissolving tanks 14.

Another method by which the invention may be practiced is depicted in Figure 2 wherein a system similar to that in Figure 1 is used with the further advantage that this method of operation eliminates the contacting of the bulk of the slurry with the naphtha. It is sometimes advantageous, where there is an existing installation using the classical method of removing $H_2S$ with caustic and then discarding the $H_2S$. Instead of discarding the sodium sulfide solution, a portion of the sulfide-containing solution is continuously or periodically withdrawn through line 19 from the $H_2S$-removal system to be regenerated. The sulfide solution is contacted in slurry tank 20 with an alkaline solution containing dissolved zinc coming from pipe 21. The resulting zinc sulfide slurry in tank 20 is withdrawn through line 22 by pump 23 and pumped through line 24 into mixer 25 for facilitating reaction by recirculation. A portion of the slurry is drawn off through line 26 and fed into filter 11 where the zinc sulfide is filtered off and the sulfide-depleted solution is recycled to the $H_2S$ removal step. Once again, the separated zinc sulfide is converted to metal and recycled to the zinc-dissolving tank.

It has been indicated above that the process is carried out with quite dilute zinc-containing solutions. This is a substantial advantage because the rate of solution of zinc in alkali is not very rapid, due to the high overvoltage of hydrogen and zinc. By arranging suitable couples, such as iron-zinc, or graphite-zinc couples, and by controlling the surface area of the zinc added to the system, the rate of solution of the zinc by the caustic solution can be maintained at any necessary rate.

A particularly important advantage of the present invention is the small capital investment required. From the flow sheet it is apparent that the only additional capital investment required is the filter. Actually, an investment is required to convert the zinc sulfide back to zinc metal. This operation however, need not be carried out at the site of the $H_2S$-removal operation. Instead, the zinc sulfide is returned to a zinc metal production plant. The economics of the zinc industry are such that the cost of converting zinc sulfide to zinc metal is only slightly greater than the cost of producing an equivalent weight of sodium hydroxide. The slight disparity between the two figures is more than made up by the advantage of using the present process in the refinery compared with the use of caustic soda followed by treatment of the waste sodium sulfide solutions.

When the quantity of sulfide to be removed per day is appreciable, or the refinery is remote from a zinc metal plant, the process described above is not economic just as the use of sodium hydroxide is not economic when the quantity of $H_2S$ to be removed per day becomes appreciable. It has been found that sodium sulfide-containing solutions can be regenerated by the use of dissolved zinc and that the resulting zinc sulfide is smoothly converted to zinc oxide by calcination at a temperature in the approximate range of 650–800° C., and the zinc oxide so formed will dissolve in alkaline sodium hydroxide solutions to form zinc-containing alkaline solutions. In this way a completely regenerative process is achieved without the necessity of converting the zinc sulfide to zinc metal. This sequence is possible because the zinc sulfide is substantially pure.

Figure 3 is an illustration of one way in which this type of process is carried out. A side-stream 9 of the zinc containing alkaline solution in which zinc sulfide is suspended is pumped via pump 8 to a filter 11. The solids are washed with water (not shown) and the washed zinc sulfide 27 then is calcined to zinc oxide by heating in the presence of air to about 700°–800° C. The calcination can take place in any suitable equipment such as a rotary kiln 28 or a multiple hearth furnace. By this means, the zinc sulfide is converted to zinc oxide 40 and the sulfur to sulfur dioxide. A relatively large excess, several hundred per cent, of air is employed in the calcining step. Although the conversion of zinc sulfide to zinc oxide is exothermic, the relatively small scale on which the process is carried out requires that fuel be burned to bring the zinc sulfide within the required temperature range. To minimize dust losses, most of this heating preferably is done indirectly. The products of combustion are mixed with the $SO_2$-containing air leaving the calciner, and the resultant gas stream sent up the stack 29. By keeping the temperature as low as possible, consistent with converting the zinc sulfide to zinc oxide at a reasonable rate, the calcined product dissolves to a sufficient extent to make the process operable.

The oxide 40 formed in the calcination step is contacted with the filtrate discharged through line 30 from the zinc sulfide filtration step. The contacting step can be carried out in contacting vessel 31 at an elevated temperature to speed up the dissolution. The resulting slurry may then be passed by pump 32 through a pressure thickener 33, the undissolved zinc oxide 34 is returned to the zinc oxide-dissolving tank, and the zinc-enriched solution is pumped back through line 35, surge tank 36 and by pump 37 through pipe 38 to the $H_2S$ removal step.

A salient factor about the process described by Figure 3 is that the process remains operable as long as the solubility of the calcined zinc oxide in the circulating caustic is greater than the solubility of the zinc sulfide. A noteworthy point about the process is that the zinc sulfide need not be completely converted to zinc oxide in the calcination step. If the product of the calcination step contains zinc sulfide, then there will be an increase in the solids concentration of the slurry flowing through the pressure thickener. This condition is rectified by diverting some of the slurry leaving the thickener to the filtrate surge tank. Eventually, the zinc sulfide in the slurry finds its way back to the calcination step and is then converted to zinc oxide.

The petroleum industry practices the extraction of mercaptans from hydrocarbons on a wide scale although not to the same degree as the removal of H₂S. The extraction processes for the removal of mercaptans involves contacting the hydrocarbon fluid with an alkaline solution capable of extracting an appreciable percentage of the mercaptans from the hydrocarbon stream, then treating the mercaptan-containing aqueous solution to diminish its mercaptan concentration and recycling it to the mercaptan extraction process. Because H₂S is a far stronger acid than mercaptans, it has been found necessary to remove H₂S from hydrocarbon solutions prior to removing mercaptans by any of the known regenerative processes. There are at least two important reasons for this. If H₂S is not removed prior to the mercaptan extraction step, then either sulfide or oxidation products of sulfur accumulate in the aqueous solution with the result that the aqueous solution loses its ability to extract mercaptans. Secondly, if the regeneration process consists of converting the extracted mercaptans to disulfides, removing the disulfides from the aqueous solution and recycling the aqueous solution to the mercaptan extraction step, it has been found that the oxidation capacity of the conversion system is consumed in oxidizing the sulfide ion to undesirable products in preference to the mercaptides. As a result, the mercaptan concentration of the aqueous solution is not diminished so that the recycled aqueous solution cannot affect the removal of mercaptans from the hydrocarbon stream with which it is contacted.

Present practice requires that if a hydrocarbon stream contains both H₂S and mercaptans, and most refinery streams do, then the H₂S must be removed from the hydrocarbon prior to the mercaptan removal process. This naturally involves both capital investment and operating costs for each removal step. By using a zinc-containing alkaline solution, both the H₂S and the mercaptans can be extracted in the same equipment. In this way both investment and operating cost are saved. The capital investment required to carry out the removal of these constituents from petroleum distillates, for example, is determined in large part by the volume of hydrocarbon, since the H₂S and mercaptan contents together rarely will constitute more than a fraction of a percent. Since H₂S is much simpler to remove than mercaptans, any contacting system suitable for mercaptan removal will be more than adequate for H₂S removal.

All regenerative mercaptan removal processes depend upon diminishing to a lesser or greater extent the mercaptan concentrations of the mercaptan-rich solution formed in the extraction step so that the ability of the aqueous solution to extract additional mercaptans is restored.

The major operating cost of carrying out a regenerative mercaptan removal process is determined by the cost of the regenerative step of the process. It has been found that the presence of the zinc makes possible a material decrease in the cost of the regenerative step. One method in commercial use for converting mercaptans dissolved in aqueous solutions to disulfides, consists of subjecting the mercaptan-containing solution to anodic oxidation in a diaphragm type electrolytic cell, such as the Shriver cell made by T. Shriver & Company, Harrison, N. J., and described in detail in U. S. Patent 2,654,706. This process can be used to illustrate by the following example, how the cost of carrying out a mercaptan-removal regenerative process may be decreased by employing a zinc-containing sodium hydroxide solution compared with a similar solution free from zinc.

A 64° API naphtha containing about .021% mercaptan sulfur is continuously fed to continuous, single stage extraction system along with one-fourth of its volume of regenerated caustic containing 12% sodium hydroxide. The outgoing naphtha contains .003% mercaptan sulfur representing the removal of about 86% of the mercaptans contained in the charge stock. The spent caustic is continuously fed to the anode side of a diaphragm type electrolytic cell equipped with an asbestos diaphragm and nickel-plated iron electrodes. A current density of 28 amperes per square foot is required to keep the mercaptan sulfur concentration of the outgoing naphtha at the .003% mercaptan sulfur concentration.

The caustic soda in the above example is replaced with an aqueous solution containing 12% sodium hydroxide plus 10 g./l. of dissolved zinc, using zinc oxide as the source of the zinc. The current density in the electrolytic cell is varied until the mercaptan sulfur concentration of the extracted naphtha is .003%. This is achieved at a current density of 18.5 amperes per square foot. In the extraction of the naphtha with the zinc-containing caustic, the hydrogen sulfide reacts with the zinc compound (zincate) to produce insoluble zinc sulfide. The zinc mercaptide formed is soluble in the caustic and remains in solution in the spent caustic which is passed through the cell as the anolyte for regeneration. The presence of the zinc permits a decrease in the required current of 34%. The presence of the zinc does not affect the required voltage so that the power required is decreased by about 34%. One of the principal capital costs is the rectifying equipment. This cost is reduced by about one-third because the direct current power output is reduced by about one-third. Hence, the presence of the zinc permits a reduction in the power cost of about one-third and a material saving in equipment.

I claim:

1. The process of extracting acidic sulfur impurities from a hydrocarbon fluid containing hydrogen sulfide and mercaptan impurities, comprising intimately contacting said fluid with an aqueous caustic alkali solution containing dissolved zinc, thereby forming solid zinc sulfide, an aqueous phase of relatively high zinc mercaptide content, and a hydrocarbon phase of reduced sulfur content, separating said aqueous phase from the hydrocarbon phase and the solid zinc sulfide, passing the separated aqueous phase through the anodic section of an electrolytic cell to form an insoluble disulfide layer and an aqueous phase of lower zinc mercaptide content, removing the disulfide layer and recycling the separated aqueous phase to the contacting step.

2. The process of reducing the sulfur content of a hydrocarbon fluid containing mercaptan impurity comprising intimately contacting said fluid with an aqueous caustic alkali solution containing dissolved zinc, thereby forming an aqueous phase of relatively high zinc mercaptide content and a hydrocarbon phase of reduced sulfur content, separating the aqueous phase and passing it through the anodic section of an electrolytic cell to form an insoluble disulfide layer and an aqueous phase of lower zinch mercaptide content, removing the disulfide layer and recycling the separated aqueous phase to the contacting step.

References Cited in the file of this patent

UNITED STATES PATENTS

| | | |
|---|---|---|
| 1,281,857 | Sheib | Oct. 15, 1918 |
| 2,417,041 | Ayers et al. | Mar. 11, 1947 |
| 2,434,868 | Sample et al. | Jan. 20, 1948 |
| 2,654,706 | Gaylor | Oct. 6, 1953 |